(12) United States Patent
Wong et al.

(10) Patent No.: US 11,832,162 B2
(45) Date of Patent: *Nov. 28, 2023

(54) TERMINAL DEVICE, INFRASTRUCTURE EQUIPMENT AND METHODS FOR RESOURCE SELECTION AND UPDATING OF ACCESS CLASS INFORMATION

(71) Applicant: Sony Group Corporation, Tokyo (JP)

(72) Inventors: Shin Horng Wong, Basingstoke (GB); Martin Warwick Beale, Basingstoke (GB); Brian Alexander Martin, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,632

(22) Filed: Aug. 8, 2022

(65) Prior Publication Data

US 2022/0408347 A1   Dec. 22, 2022

Related U.S. Application Data

(63) Continuation of application No. 16/900,061, filed on Jun. 12, 2020, now Pat. No. 11,419,037, which is a
(Continued)

(30) Foreign Application Priority Data

Jan. 12, 2016  (EP) .................................... 16150966

(51) Int. Cl.
*H04W 48/06* (2009.01)
*H04W 72/02* (2009.01)
(Continued)

(52) U.S. Cl.
CPC .......... *H04W 48/06* (2013.01); *H04B 17/327* (2015.01); *H04W 48/16* (2013.01);
(Continued)

(58) Field of Classification Search
CPC ..... H04W 48/06; H04W 48/16; H04W 72/02; H04W 72/121; H04W 72/542;
(Continued)

(56) References Cited

U.S. PATENT DOCUMENTS 9,307,447 B2 *  4/2016  Widell .................... H04L 5/003
9,801,122 B2    10/2017  Kim et al.
(Continued)

OTHER PUBLICATIONS

International Search Report and Written Opinion for PCT/EP2016/082758 dated Jun. 26, 2017.
(Continued)

*Primary Examiner* — Brian T O Connor
(74) *Attorney, Agent, or Firm* — XSENSUS LLP

(57) ABSTRACT

A terminal device for use with a wireless telecommunications network includes a transceiver configured to receive information indicative of one or more access classes of terminal devices which are permitted to exchange signals with the wireless telecommunications network, and a controller configured to update the received information to modify the one or more access classes of terminal devices which are permitted to exchange signals with the mobile telecommunications network, the received information being updated by the controller according to a predetermined function of time.

20 Claims, 8 Drawing Sheets

Related U.S. Application Data continuation of application No. 16/067,462, filed as application No. PCT/EP2016/082758 on Dec. 28, 2016, now Pat. No. 10,687,268.

(51) Int. Cl.

| | | |
|---|---|---|
| *H04W 72/542* | (2023.01) | |
| *H04B 17/327* | (2015.01) | |
| *H04W 48/16* | (2009.01) | |
| *H04W 72/121* | (2023.01) | |
| *H04W 72/00* | (2023.01) | |
| *H04W 48/02* | (2009.01) | |
| *H04W 48/08* | (2009.01) | |

(52) U.S. Cl.
CPC ......... *H04W 72/02* (2013.01); *H04W 72/121* (2013.01); *H04W 72/542* (2023.01); *H04W 48/02* (2013.01); *H04W 48/08* (2013.01); *H04W 72/00* (2013.01)

(58) Field of Classification Search
CPC ..... H04W 48/02; H04W 48/08; H04W 72/00; H04B 17/327
See application file for complete search history.

(56) References Cited

U.S. PATENT DOCUMENTS

| | | | |
|---|---|---|---|
| 10,085,171 B2 | 9/2018 | Nguyen | |
| 10,251,112 B2 | 4/2019 | Fujishiro et al. | |
| 10,327,227 B2 | 6/2019 | Xu et al. | |
| 10,455,596 B2 | 10/2019 | Cui et al. | |
| 10,687,268 B2* | 6/2020 | Wong | H04W 72/542 |
| 11,419,037 B2* | 8/2022 | Wong | H04W 72/02 |
| 2011/0201307 A1 | 8/2011 | Segura | |
| 2011/0244907 A1 | 10/2011 | Golaup et al. | |
| 2011/0287794 A1 | 11/2011 | Koskela et al. | |
| 2012/0236810 A1 | 9/2012 | Park et al. | |
| 2013/0094385 A1 | 4/2013 | Gunnarsson et al. | |
| 2013/0107778 A1 | 5/2013 | Ryu et al. | |
| 2014/0120938 A1 | 5/2014 | Widell et al. | |
| 2018/0054768 A1 | 2/2018 | Ohta et al. | |
| 2018/0323884 A1 | 11/2018 | Ku et al. | |

OTHER PUBLICATIONS

Lee, Y., "Summary of Email Discussion on Access Control in NB-IOT", LG Electronics, Inc., 5 Pages total (Nov. 16-20, 2015).
Holma, H., et al., "LTE for UMTS: OFDMA and SC-FDMA Based Radio Access", Wiley, pp. 25-27 (Jan. 16, 2009).
Qualcomm Incorporated, "New Work Item: NarrowBand IOT (NB-IOT)", 3GPP TSG RAN Meeting #69, 8 Pages total (Sep. 14-16, 2015).
CMCC, et al., "Way Forward on NB-IoT", 3GPP TSG RAN WG1 #83, 3 Pages total (Nov. 15-22, 2015).
Chung, Y-J., "Draft Report of 3GPP TSG RAN WG2 Meeting #92", ETSI MCC, 245 Pages total (Nov. 16-20, 2015).

* cited by examiner

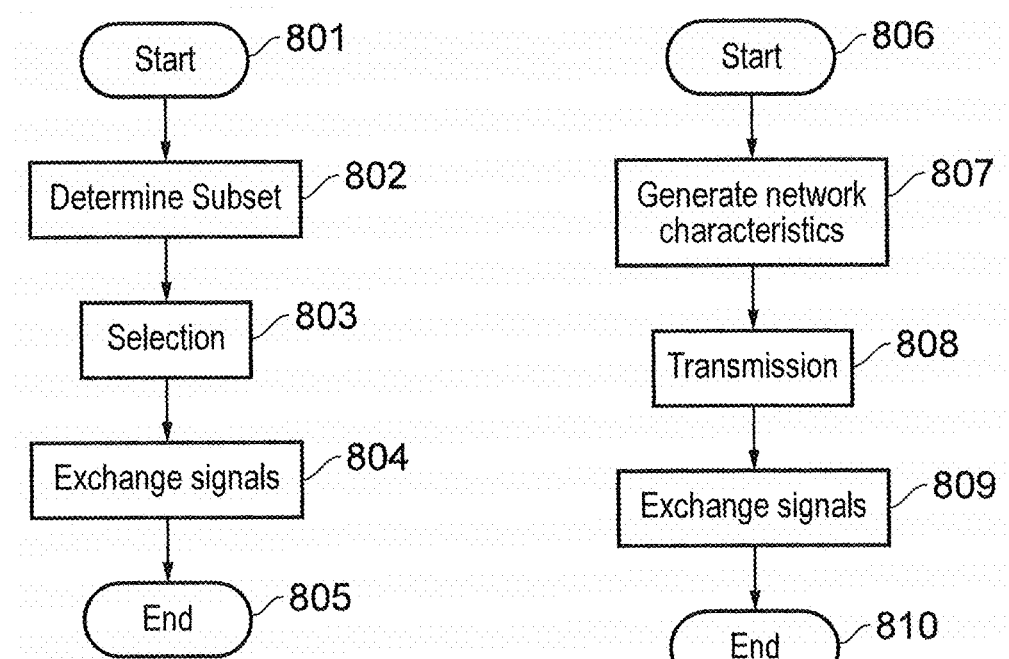

TERMINAL DEVICE, INFRASTRUCTURE EQUIPMENT AND METHODS FOR RESOURCE SELECTION AND UPDATING OF ACCESS CLASS INFORMATION

CROSS-REFERENCE TO RELATED APPLICATIONS

The present application is a continuation of U.S. application Ser. No. 16/900,061, filed Jun. 12, 2020, which is a continuation of U.S. application Ser. No. 16/067,462, Jun. 29, 2018, which is based on PCT filing PCT/EP2016/082758, filed Dec. 28, 2016, which claims priority to EP 16150966.6, filed Jan. 12, 2016, the entire contents of each are incorporated herein by reference.

FIELD OF DISCLOSURE

The present disclosure relates to a terminal device, infrastructure equipment and methods.

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation wireless communications systems, such as those based on the third generation project partnership (3GPP) defined Universal Mobile Telecommunications System (UMTS) and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication (MTC) devices, devices which require little or no mobility, high resolution video displays and virtual reality headsets. As such, supporting such a wide range of communications devices can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations, making radio communications challenging.

SUMMARY OF THE DISCLOSURE

In a first embodiment, the present technique provides a terminal device for use with a wireless telecommunications network. The terminal device comprises a transceiver configured to receive information indicative of one or more access classes of terminal devices which are permitted to exchange signals with the wireless telecommunications network, and a controller configured to update the received information to modify the one or more access classes of terminal devices which are permitted to exchange signals with the mobile telecommunications network, the received information being updated by the controller according to a predetermined function of time.

In the first embodiment, the present technique also provides infrastructure equipment for use with a wireless telecommunications network. The infrastructure equipment comprises a controller configured to generate information indicative of one or more access classes of terminal devices which are permitted to exchange signals with the wireless telecommunications network and to generate a function of time according to which a terminal device of the wireless telecommunications network is configured to update the information to modify the one or more access classes of terminal devices which are permitted to exchange signals with the mobile telecommunications network. The infrastructure equipment also comprises a transceiver configured to transmit the generated information and function of time to the terminal device.

In a second embodiment, the present technique provides a terminal device for use with a wireless telecommunications network. The terminal devices comprises a transceiver configured to exchange signals with the wireless telecommunications network using one of a plurality of predetermined radio frequency resources, and a controller configured to determine a subset of the plurality of predetermined radio frequency resources on the basis of a network characteristic indicative of a network preference for biasing access to each predetermined radio frequency resource and an operational characteristic associated with the terminal device, and to select the one of the plurality of predetermined radio frequency resources from the determined subset.

In the second embodiment, the present technique also provides infrastructure equipment for use with a wireless telecommunications network. The infrastructure equipment comprises a controller configured to generate a network characteristic indicative of a network preference for biasing access to each of a plurality of predetermined radio frequency resource by a terminal device of the wireless telecommunications network, the network characteristic determined for each predetermined radio frequency resource being for use by the terminal device in selecting one of the plurality of predetermined radio frequency resources. The infrastructure equipment also comprises a transceiver configured to transmit, to the terminal device, the generated network characteristic indicative of the network preference for biasing access to each of the plurality of predetermined radio frequency resource by the terminal device, and to exchange signals with the terminal device using the one of a plurality of predetermined radio frequency resources.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 8A shows a flow chart schematically illustrating a method as carried out by a terminal device according to the second embodiment of the present technique; and FIG. 8B shows a flow chart schematically illustrating a method as carried out by infrastructure equipment according to the second embodiment of the present technique.

DETAILED DESCRIPTION OF THE EMBODIMENTS

Conventional Communications System

Figure 1:
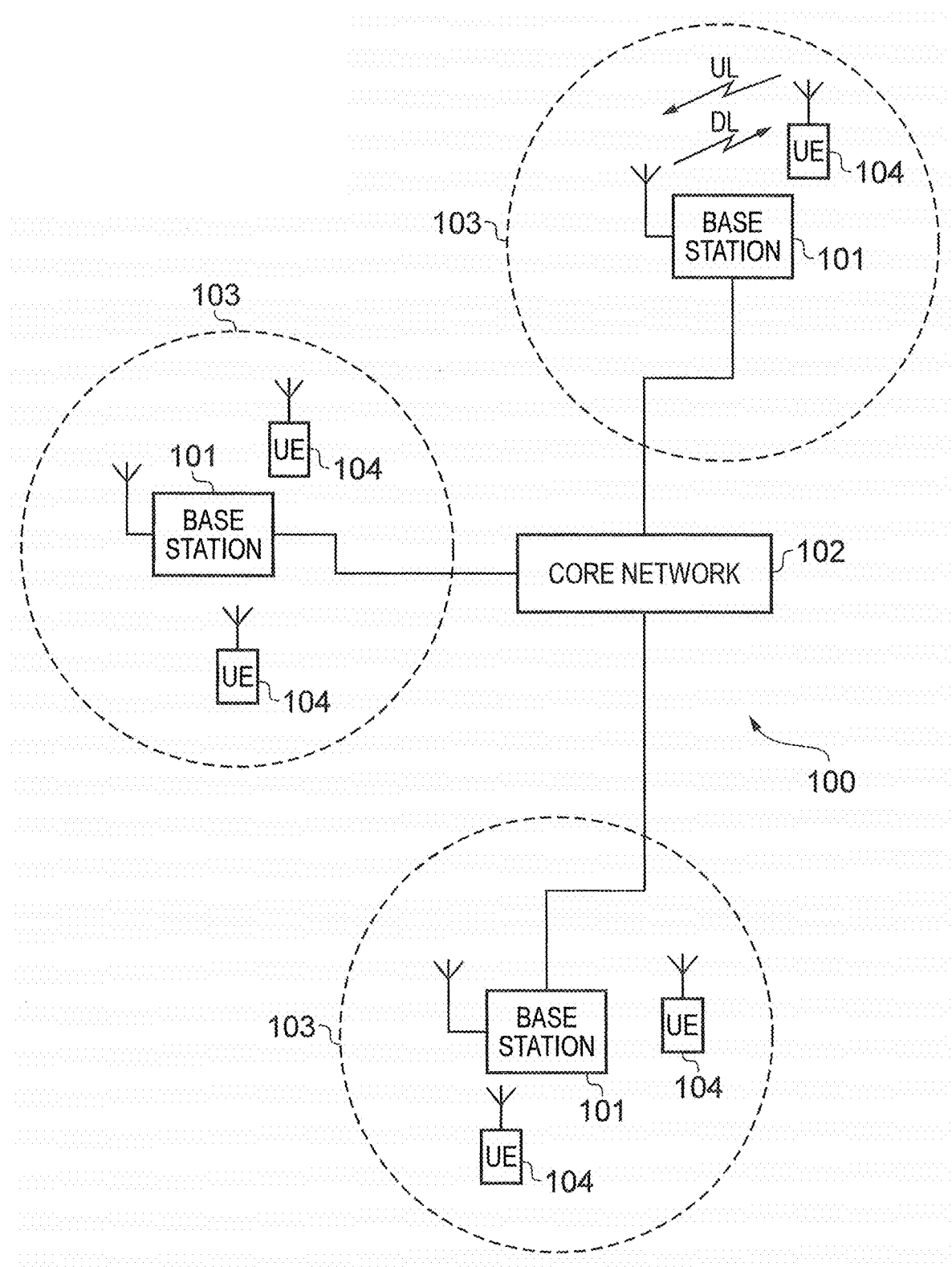
FIG. 1 is a schematic block diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, terminal device and so forth. Base stations may also be referred to as transceiver stations/NodeBs/eNodeBs (eNB for short), and so forth. A base station is an example of infrastructure equipment.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Figure 2:
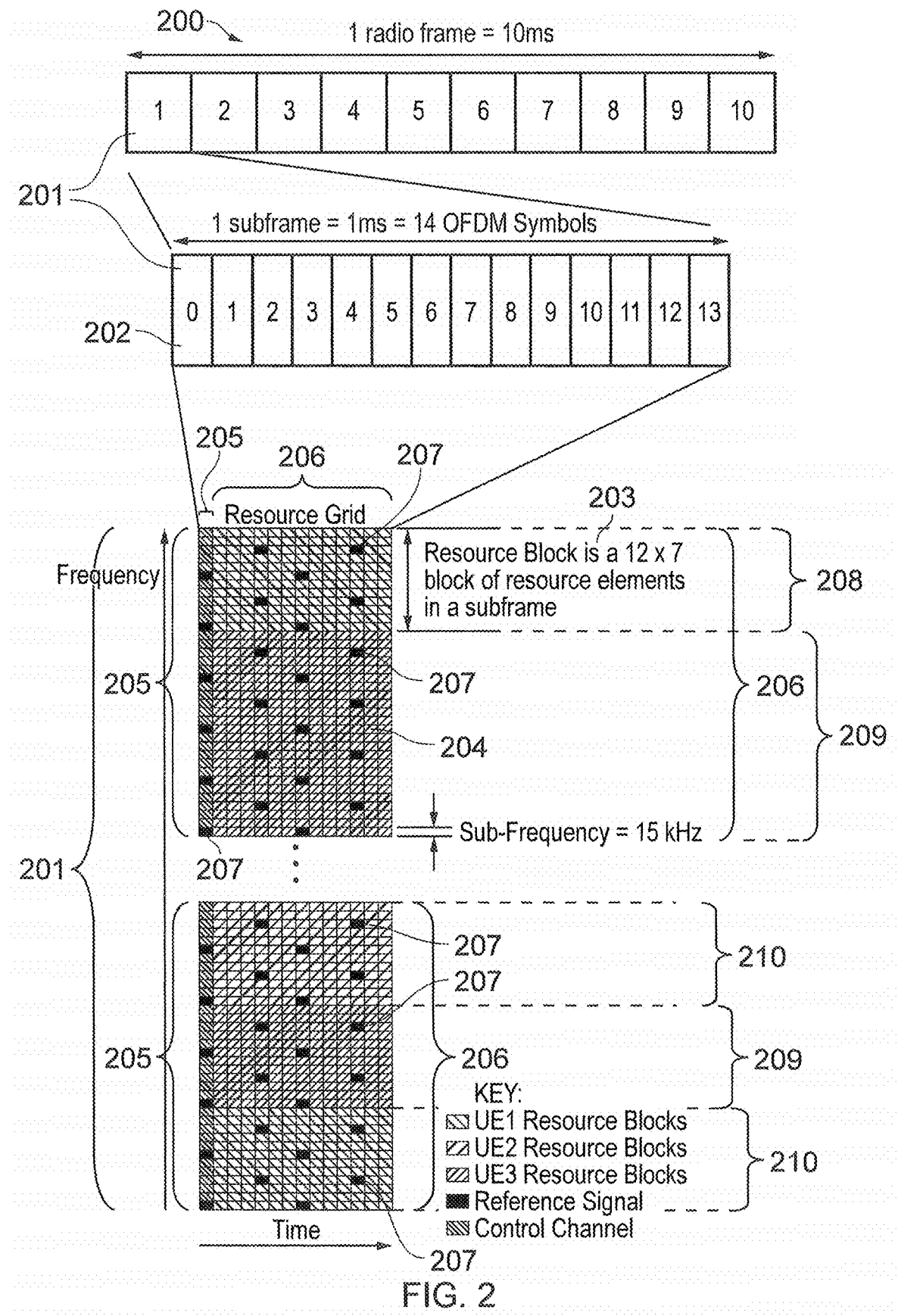
FIG. 2 is a schematic representation illustrating a frame structure of a down-link of a wireless access interface according to an LTE standard.

FIG. 2 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is conventionally fixed at 15 KHz. However it has been proposed in the future [2] [3] to provide also a reduced subcarrier spacing of 3.75 kHz for certain parts of the LTE wireless access interface for both the uplink and the downlink. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the down-link structure of the LTE wireless access interface are provided in Annex 1.

Figure 3:
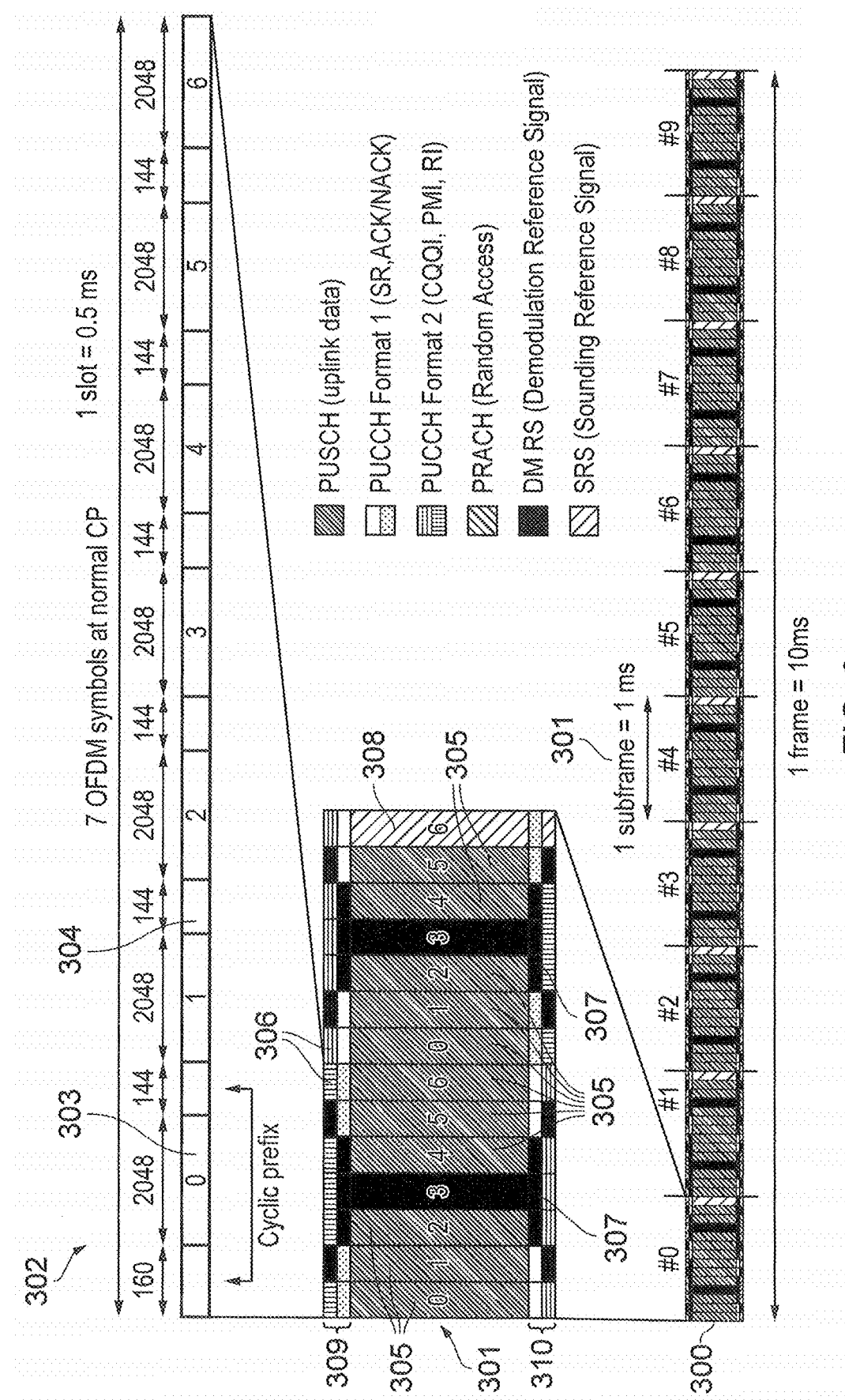
FIG. 3 is a schematic representation illustrating a frame structure of an up-link of wireless access interface according to an LTE standard.

FIG. 3 provides a simplified schematic diagram of the structure of an uplink of an LTE wireless access interface that may be provided by or in association with the eNB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes. More details of the LTE up-link represented in FIG. 3 are provided in Annex 1.

Narrowband Internet of Things

As explained above, it has been proposed to develop an adaptation of a mobile communications network (NW) to accommodate narrow band communications within an existing wireless access interface which has been developed to provide broadband wireless communications. For example, in 3GPP a project relating to improvements to LTE wireless access interfaces to provide for a Narrowband Internet of Things (NB-IoT) was agreed [2]. This project is aimed at improved indoor coverage, support for a massive number of low throughput devices, low delay sensitivity, ultra-low device cost, low device power consumption and (optimised) network architecture. An example of such a device is a smart meter. It has been proposed that an NB-IoT communications system supports a bandwidth of only 180 kHz and can have three operational modes:

1. 'Stand-alone operation' utilizing for example the spectrum currently being used by GERAN systems as a replacement of one or more GSM carriers 2. 'Guard band operation' utilizing the unused resource blocks within an LTE carrier's guard-band 3. 'In-band operation' utilizing resource blocks within a normal LTE carrier NB-IoT is expected to support a large number of devices (for example, over 50,000) per cell. When there are multiple bands which support NB-IoT operation (that is, multiple NB-IoT carriers), the network can distribute the UEs among the different NB-IoT bands/carriers.

It is known in wireless telecommunications systems such as LTE and UMTS to have access classes in the range 0-15. Access classes 0-9 are assigned to normal UEs, and have equal priority. These values are distributed evenly amongst UEs in order that each access class will be associated with approximately 10% of UEs (so 10% of UEs will have access class 0, another 10% of UEs will have access class 1, another 10% of UEs will have access class 2, etc.). Access class 10 is used by UEs which are establishing an emergency call in order to allow prioritization of this call type. Access classes 11-15 each have specific meanings, and are allocated to high priority devices such as those used by public safety services.

In LTE, currently a UE using access class (AC) 0-9 will draw a random number in the range 0-1. The UE then compares this random number to a broadcast threshold. If the random number is less than the threshold then the UE is allowed to access the cell, otherwise it is barred for a time period indicated by the network, before attempting to access again. This method allows the network to prevent a percentage of UEs from accessing in times of high load/congestion. In UMTS, and also for extended access barring (EAB) for MTC devices, the network broadcasts a barring bitmap of 10 bits which indicates which specific access classes are allowed to access the network.

It has also been agreed that access class control of NB-IoT carriers will also be implemented using a barring bitmap [4]. A problem, however, is that, in order to allow the different UEs with access classes 0-9 (equal priority UEs) an equal opportunity to access the network, the network will typically periodically update the barring bitmap broadcast in system information, so that the allowed access classes vary over time and no UE remains barred indefinitely (if the network always bars the same access classes then these unfortunate UEs would always be the ones without service, which is undesirable). However, updating of system information requires processing and signalling overhead. Using the legacy system information update procedure, the network must page all UEs and those UEs must perform system information acquisition. Using the system information update procedure for EAB, the UEs need to only acquire the EAB System Information Block (SIB). However this still comes at a cost of having to perform SIB reception for each update. There has also been some discussion about whether paging is necessary for every SIB update for NB-IOT barring. An alternative would be that a UE is required to check SIB before accessing each time. However, this means that in case there is no barring (usual case), this adds the unnecessary additional SIB reception every time the UE needs to access the network. There is therefore a need to provide a way of implementing NB-IoT access class control with reduced processing and signalling overhead.

Figure 4:
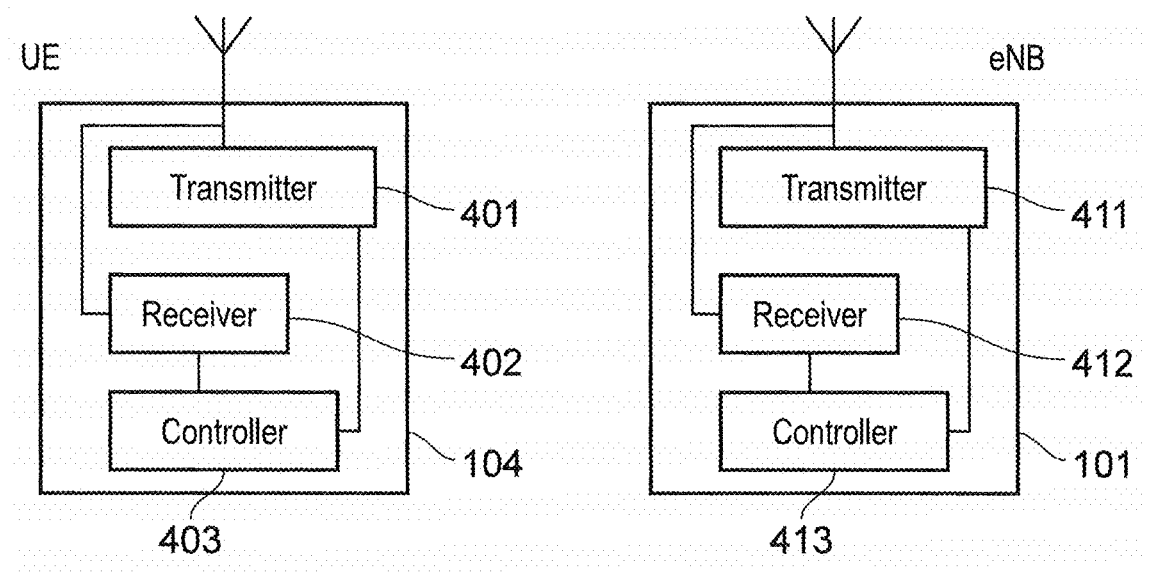
FIG. 4 is a schematic block diagram of a terminal device and infrastructure equipment according to first and second embodiments of the present technique.

FIG. 4 provides an example block diagram of a terminal device or UE 104 and a base station or eNB 101 in accordance with first and second embodiments of the present technique. As shown in FIG. 4, a UE 104 includes a transmitter 401 and a receiver 402 (which together act as a transceiver) which are controlled by a controller 403. Correspondingly, the eNB 101 includes a transmitter 411 and a receiver 412 (which together act as a transceiver) which are controlled by a controller 413 which can be referred to as a scheduler. As explained above, the UE 104 transmits and receives signals to and from the eNB 101 via a wireless access interface provided by the eNB as part of the wireless communications network.

In the first embodiment of the present technique, a barring bitmap transmitted to each UE 104 by the cell is updated as a predetermined function of time, so that the access classes which are allowed/not allowed to access a particular NB-IoT carrier vary over time without requiring the barring bitmap to be updated in system information. The processing and signalling overhead associated with each update of the barring bitmap being included in the system information is therefore alleviated.

In an embodiment, access class barring is enabled/disabled and updated using paging from the network. This means that there is no need to perform the SIB acquisition before every access attempt, because each UE 104 will be informed via paging and/or value tag update that the barring bitmap has been changed. The UE 104 then applies a time function to determine the actual barring bitmap to be used based on the received barring bitmap and the system frame number (SFN) or hyper-system frame number (H-SFN—this is an extension to SFN which has been introduced for extended discontinuous reception (DRX) in LTE and will be applied to NB-IOT). Based on the broadcast and received barring bitmap, and the SFN or H-SFN, the UE 104 knows the time window in which it will be allowed to access. There is therefore no need to check the system information before access, no need to apply an additional barring timer, and no need to frequently update the system information.

It is noted that the present embodiment has a similar effect as providing a threshold percentage and a barring time, as per the legacy LTE access class barring. However, with the present embodiment, the barring bitmap can be specifically chosen, so that the network knows and controls what specific UEs are barred at any point of time rather than relying on a randomly drawn number.

To be clear, a barring bitmap is therefore initially transmitted to the UE 104 by the network via a system information broadcast message or the like. The barring bitmap is then updated one or more times according to a predetermined function of time known to the UE 104. A new barring bitmap therefore does not have to be transmitted to the UE 104 by the network every time the barring bitmap is to be updated. Rather, the barring bitmap is updated in accordance with the predetermined function of time. Eventually, a new barring bitmap may be transmitted to the UE 104 by the network so as to provide a new sequence of barring bitmaps to be used (as determined by the predetermined function of time). In this case, the UE 104 is informed of the existence of the new barring bitmap via paging or the like, and the UE 104 then receives the new barring bitmap again via a system information broadcast message. However, it will be appreciated that, due to the use of the predetermined function of time for generating updated barring bitmaps, the need for such new barring bitmaps to be transmitted to the UE 104 occurs less often compared to the case in which a new barring bitmap must be transmitted to the UE 104 by the network every time the barring bitmap is to be updated. In this description, the original barring bitmap received by the UE 104 from the network and to which the predetermined function of time is applied to generate updated barring bitmaps may be referred to as the initial barring bitmap.

The following provides an example of how the present embodiment may be implemented. In this case, the initial barring bitmap is set to 1100000000 (meaning that access classes 0 and 1 from the access class range 0 to 9 are barred). The UE 104 then updates the barring bitmap each time H-SFN mod N=0 for successively increasing H-SFN, so that the bitmap is updated every N H-SFNs. An example of the barring bitmaps which may be generated from the initial barring bitmap using such a calculation is shown in Table 1.

TABLE 1

| H-SFN | Barring bitmap |
|---|---|
| 0 | 1100000000 |
| N | 0011000000 |
| 2N | 0000110000 |
| 3N | 0000001100 |
| 4N | 0000000011 |
| 5N | 1100000000 |
| 6N | 0011000000 |
| ... | ... |

It can be seen here that the bit map is shifted by two points to the right after every N hyper-frames. In this example, there are 5 different bitmaps (the initial barring bitmap plus four possible updates achieved by the bitmap shifting), and thus once H-SFN=5N, the bitmap for H-SFN=0 is re-used. In this way, the different possible bitmaps are periodically cycled through.

In another example, the initial barring bitmap is again set to 1100000000 (meaning that access classes 0 and 1 from the access class range 0 to 9 are barred) and there are again four possible updates achieved by bitmap shifting. This gives 5 different bitmaps. Each of the 5 different bitmaps are then indexed with a respective number from 0 to 4, and for a given H-SFN, the UE 104 applies the barring bitmap indexed by $$\left\lfloor \frac{H-SFN}{N} \right\rfloor \bmod 5.$$

More generally, when there are M possible barring bitmaps (including the initial barring bitmap, plus all possible updates, although since the initial barring bitmap itself can also be considered as a bitmap update, it can be said that there are M possible bitmap updates), each bitmap is indexed with a respective number from 0 to M-1, and for a given H-SFN, the UE 104 applies the barring bitmap indexed by $$\left\lfloor \frac{H-SFN}{N} \right\rfloor \bmod M.$$

Here, the bitmap is again updated every N H-SFNs, and M is the total number of different bitmaps. An example of the barring bitmaps which may be generated from the initial barring bitmap using such a calculation is shown in Table 2 for M=5.

TABLE 2

| $\left\lfloor \frac{H-SFN}{N} \right\rfloor \bmod M$ | Barring bitmap |
|---|---|
| 0 | 1100000000 |
| 1 | 0011000000 |
| 2 | 0000110000 |
| 3 | 0000001100 |
| 4 | 0000000011 |

Thus, for example, if N=5, then for H-SFN=0, 1, 2, 3 and 4, $$\left\lfloor \frac{H-SFN}{N} \right\rfloor \bmod M = 0$$

and thus the bitmap 1100000000 is used. Then, for H-SFN=5, 6, 7, 8 and 9, $$\left\lfloor \frac{H-SFN}{N} \right\rfloor \bmod M = 1$$

and thus the bitmap 0011000000 is used.

It will be appreciated that descriptions of Tables 1 and 2 are only examples, and that, in general, the network will be able to control the time period after which the barring bitmap is to be updated (for example, every H-SFN, every N H-SFNs, and so on) and to specify how the pattern is to be updated (the time period and updated barring bitmap patterns being defined as part of the predetermined function of time).

For example, instead of shifting the bitmap, another example would be to provide several explicit patterns, which are activated at certain times.

For example, the network may provide the following bitmaps:

a) 1010100000 b) 0101011111

The network may then control the UE 104 to switch bitmap every 8 H-SFN (for example) by providing a parameter specifying the number of H-SFNs (8, in this case) after which the bitmap should be switched from (a) to (b) and vice versa.

Thus, it will be appreciated that, with embodiments of the present technique, the need for frequent updates to system information to change barred access classes (in particular, barred access classes for NB-IoT carriers) and to thus allow fair network access to all UEs is alleviated. This reduces the processing and signalling overhead associated with such updates. The UE power consumption associated with frequent reading of system information, either upon SIB update, or before every access, is also reduced. The arrangement is also more deterministic (compared to, for example, determining whether a UE is to be granted access based on the generation of a random number).

It is noted that the predetermined function of time may be transmitted to the UE in the system information broadcast message or the like along with the barring bitmap. In this case, each time a new barring bitmap is transmitted to the UE, a new predetermined function of time may also be transmitted to the UE for use with the new barring bitmap. Alternatively, the same predetermined function of time may be used (and may or may not be re-transmitted with the new barring bitmap). Alternatively the predetermined function of time can be signaled to UEs via unicast signaling, or groupwise signalling, allowing different UEs to attach to the network with different latencies.

It will be appreciated that although, in the above-mentioned embodiments, the barred and non-barred access classes are represented by a bitmap, this is just an example, and any other information indicative of one or more access classes of terminal devices which are permitted to exchange signals with the wireless telecommunications network may be used. Thus, more generally, it is the information (of which the bitmap is an example) which is updated in the way that has been described.

It will thus be appreciated that the first embodiment of the present technique provides, in general, a terminal device (for example, terminal device 104) for use with a wireless telecommunications network. The terminal device comprises a transceiver (implemented, for example, using transmitter 401 and receiver 402) configured to receive information indicative of one or more access classes of terminal devices which are permitted to exchange signals with the wireless telecommunications network. The terminal device also comprises a controller (for example, controller 403) configured to update the received information to modify the one or more access classes of terminal devices which are permitted to exchange signals with the mobile telecommunications network, the received information being updated by the controller according to a predetermined function of time.

In an embodiment, the controller is configured to control the transceiver to exchange signals with the wireless telecommunications network at a particular time when an access class of the terminal device matches one of the one or more access classes of terminal devices which are permitted to exchange signals with the wireless telecommunications network at that particular time.

In an embodiment, the transceiver is configured to receive at least one of the information and the predetermined function of time via a system information broadcast message from the wireless telecommunications network.

In an embodiment, the information indicative of the one or more access classes of terminal devices which are permitted to exchange signals with the wireless telecommunications network is a bitmap, wherein the position of each bit in the bitmap is indicative of a respective access class and the bit at each position is indicative of whether or not that access class is permitted to exchange signals with the wireless telecommunications network.

In an embodiment, the controller is operable to periodically update the received information at a time period and in a manner specified by the predetermined function of time. When the information is a bitmap, each update of the bitmap may comprise performing a shift operation on elements of the bitmap in accordance with a predetermined rule (as described with reference to Tables 1 and 2, for example). Alternatively, each update of the bitmap may comprise defining the bitmap as one of a plurality of predetermined bitmaps. In an embodiment, the possible updates of the information are consecutively applied and periodically repeated. In other words, the possible updates of the information according to the predetermined function of time are cycled through and the cycle is then repeated (this would result in, for example, the bitmap being sequentially updated to each of the barring bitmaps shown in Tables 1 and 2—once the final bitmap corresponding to H-SFN=4N or the index $$\left\lfloor \frac{H-SFN}{N} \right\rfloor \mathrm{mod} M = M-1$$

has been used, the sequence returns to the first bitmap corresponding to H-SFN=0 or the index $$\left\lfloor \frac{H-SFN}{N} \right\rfloor \mathrm{mod} M = 0,$$

and the sequence is repeated).

In an embodiment, the time period at which the received information is periodically updated is defined with reference to a time changing parameter associated with successive radio frames via which the transceiver is configured to exchange signals with the wireless telecommunications network. For example, the time changing parameter is a system frame number (SFN) or Hyper-system frame number (H-SFN) of successive radio frames In one example, the time period at which the received information is periodically updated is defined by a predetermined number N of SFNs or H-SFNs.

For example, the update to the information is applied when the following equation is satisfied:

H-SFN Mod N=0

Such an example is described with reference to Table 1.

In another example, there are M possible updates to the information indicative of the one or more access classes of terminal devices which are permitted to exchange signals with the wireless telecommunications network. Each possible update is associated with a respective index value from 0 to M-1, and the update of the information used to define the one or more access classes of terminal devices which are permitted to exchange signals with the wireless telecommunications network for a given H-SFN is the update with index:

$$\left\lfloor \frac{H - SFN}{N} \right\rfloor \bmod M$$

Such an example is described with reference to Table 2.

In an embodiment, the terminal device is a Narrowband Internet of Things (NB-IoT) terminal device.

It will also be appreciated that the first embodiment of the present technique provides, in general, infrastructure equipment (such as base station 101) for use with the wireless telecommunications network. The infrastructure equipment comprises a controller (such as controller 413) configured to generate the information indicative of one or more access classes of terminal devices which are permitted to exchange signals with the wireless telecommunications network and to generate a function of time according to which the terminal device (such as terminal device 104) is configured to update the information to modify the one or more access classes of terminal devices which are permitted to exchange signals with the mobile telecommunications network. The infrastructure also comprises a transceiver (implemented using transmitter 411 and receiver 412, for example) configured to transmit the generated information and the function of time to the terminal device. In this case, the function of time generated by the controller and transmitted to the terminal device is the predetermined function of time.

Figure 5:
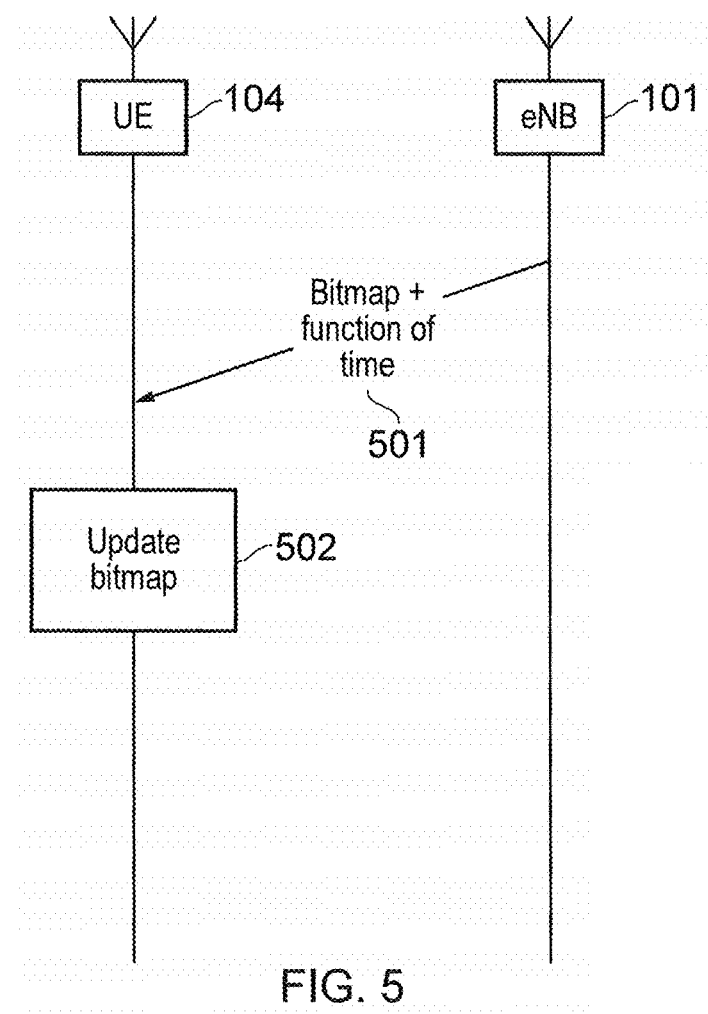
FIG. 5 schematically illustrates a method according to the first embodiment of the present technique.
Figures 6A, 6B:
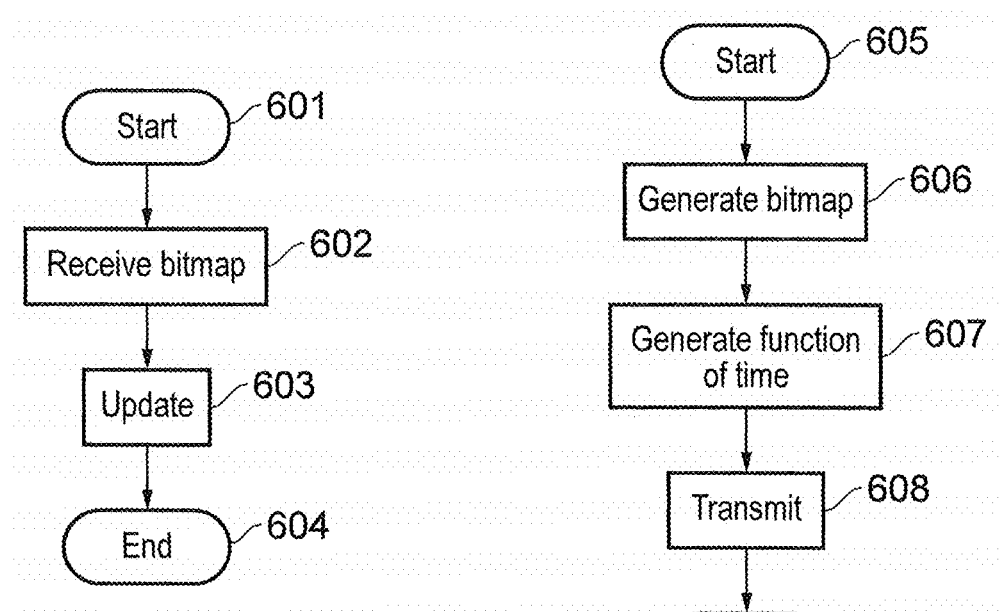
FIG. 6A shows a flow chart schematically illustrating a method as carried out by a terminal device according to the first embodiment of the present technique.
FIG. 6B shows a flow chart schematically illustrating a method as carried out by infrastructure equipment according to the first embodiment of the present technique.

FIGS. 5 and 6A-B schematically illustrate a method according to the first embodiment.

In FIG. 5, it is seen that, at step 501, the infrastructure equipment (in the form of eNB 101) generates the information indicative of the one or more access classes of terminal devices which are permitted to exchange signals with the wireless telecommunications network and generates the function of time according to which the terminal device 104 is configured to update the information to modify the one or more access classes of terminal devices which are permitted to exchange signals with the mobile telecommunications network. The generated information and function of time are then transmitted to the terminal device 104. Then, at step 502, once the generated information and function of time are received by the terminal device 104, the terminal device 104 updates the received information to modify the one or more access classes of terminal devices which are permitted to exchange signals with the mobile telecommunications network, the received information being updated by the controller according to the function of time.

FIG. 6A shows a flow chart schematically illustrating the method carried out by the controller 403 of the terminal device 104. The method starts at step 601. At step 602, the controller 403 controls the transceiver 401, 402 of the terminal device to receive the information (which, in this case, is a barring bitmap) indicative of the one or more access classes of terminal devices which are permitted to exchange signals with the wireless telecommunications network. At step 603, the controller 403 updates the received information to modify the one or more access classes of terminal devices which are permitted to exchange signals with the mobile telecommunications network, the received information being updated by the controller according to the predetermined function of time. In one embodiment, the predetermined function of time is the function of time generated by the infrastructure equipment and transmitted to the terminal device 104 with the initial information. The method ends at step 604.

FIG. 6B shows a flow chart schematically illustrating the method carried out by the controller 413 of the infrastructure equipment (in the form of eNB 101). The method starts at step 605. At step 606, the controller 413 generates the information indicative of the one or more access classes of terminal devices which are permitted to exchange signals with the wireless telecommunications network. At step 607, the controller 413 generates the function of time according to which the terminal device 104 is configured to update the information to modify the one or more access classes of terminal devices which are permitted to exchange signals with the mobile telecommunications network. At step 608, the controller 413 controls the transceiver 411, 412 of the infrastructure equipment to transmit the generated information and function of time to the terminal device. The method ends at step 609.

It is noted that in an alternative embodiment, the infrastructure equipment may transmit only the initial information to the terminal device, and the predetermined function of time may be known to the controller 403 of the terminal device in advance. In this case, a function of time does not need to be generated by the infrastructure equipment and transmitted to the terminal device with the initial information, since the predetermined function of time is already known to the controller 403.

It is also noted that Multiple NB-IoT carriers (each 180 kHz) can be configured within a system bandwidth. For example, Multiple NB-IoT carriers each occupying a single physical resource block (PRB) can be configured in-band within an LTE system. It has been proposed that for a Multiple NB-IoT carrier operation, a primary carrier (also referred to as an anchor carrier) and multiple secondary carriers are used, wherein a primary carrier contains synchronisation channels such as narrow band primary synchronisation signals (NB-PSS)/narrow band secondary synchronisation signals (NB-SSS) and common control channels such as Master Information Block (MIB, carried by narrow band physical broadcast channel (NB-PBCH)) and SIBs. The primary carriers can contain unicast traffic in addition. The secondary carriers contain unicast traffic, but do not contain the full set of synchronisation and control channels. This arrangement reduces the control channel overheads by avoiding having synchronisation & common control channels in every NB-IoT carrier. Multiple NB-IoT carriers can also be deployed when there is a mixture of guard-band and in-band NB-IoT carriers. For example, the guard-band NB-IoT carrier can be the primary carrier whilst the in-band NB-IoT carriers are secondary carriers.

As previously mentioned, NB-IoT is expected to support a large number of devices (for example, over 50,000) per cell. For a Multiple NB-IoT carriers operation, the network can distribute the UEs among the different secondary carriers.

In order to access the network, the NB-IoT device performs a Random Access procedure. For a Multiple NB-IoT carriers operation, some of the secondary carriers (and possibly the primary carrier) can be configured with Physical Random Access Channel (PRACH) resources and these are indicated in the SIB. Typically, a UE would select the PRACH resource based on criteria (for example, its coverage level, as in enhanced MTC (eMTC)) and for those PRACH resources corresponding to the criteria, the UE would randomly select one. The selected PRACH resource may belong to a secondary band experiencing high load and may not be able to serve the NB-IoT device. If multiple secondary bands are congested then such attempts may waste UE battery power and cause congestion in the resources (for example, PRACH resources) of that band. There is therefore a need to provide a way for an NB-IoT device to select an appropriate NB-IoT band for Random Access which alleviates these problems.

Thus, according to the second embodiment of the present technique, individual restrictions are imposed on each of the NB-IoT bands under a Multiple NB-IoT carriers operation. The parameters forming this restriction are indicated in the SIB.

In one embodiment, the Access Class Barring (ACB) mechanism (as previously mentioned) is extended for each NB-IoT band that is configured with RACH resources (in particular, PRACH resources) under a Multiple NB-IoT carriers operation. The ACB configurations for each NB-IoT band (secondary bands or primary band) are indicated in the SIB (which may reside in the primary band) and provide further band specific parameters which the UE 104 needs to use in addition to the barring bitmap to calculate whether access is allowed.

For example, consider a Multiple NB-IoT carriers operation with 3 secondary bands (Secondary Band #1, Secondary Band #2 and Secondary Band #3) and a primary band. The ACB can be configured as shown in Table 3. Here the Primary Band and Secondary Band #2 are heavily loaded and so only allow a single Access Class (AC) (AC0 and AC6, respectively) to access the NB-IoT band. Secondary Band #3 is not congested and can allow all UEs to access it.

TABLE 3

| NB-IoT Bands | Access Class | | | | | | | | | |
|---|---|---|---|---|---|---|---|---|---|---|
| | 0 | 1 | 2 | 3 | 4 | 5 | 6 | 7 | 8 | 9 |
| Primary | √ | x | x | x | x | x | x | x | x | x |
| Secondary #1 | x | √ | √ | √ | x | x | x | x | x | x |
| Secondary #2 | x | x | x | x | x | x | √ | x | x | x |
| Secondary #3 | √ | √ | √ | √ | √ | √ | √ | √ | √ | √ |

In one embodiment, for those NB-IoT bands in which the UE 104 is not barred, it may select the NB-IoT band with the highest measured signal strength or quality. One such measurement is the reference signal received power (RSRP).

In another embodiment, for those NB-IoT bands in which the UE 104 is not barred, the UE would select a band randomly (based on a uniform distribution, for example).

In another embodiment, for those NB-IoT bands in which the UE 104 is not barred, it would select the NB-IoT band with the least number of barred Access Class (AC). This aspect recognises that the number of barred AC is an indication that a band is congested. For example in Table 3, a UE with AC=2 is able to access Secondary Band #1 and Secondary Band #3. Since Secondary Band #3 has more Access Classes not barred, the UE will firstly attempt to access Secondary Band #3. If it fails to access it after a predefined number of attempts, it will try to access the band with the second least barred AC. For cases where two or more bands have equal number of ACs being barred, the UE may select one of them randomly based on uniform distribution, for example.

In another embodiment, a restriction to allow a subset of UEs (that are not barred) to access the network at a time is applied. This restriction is based on an identifier of each UE (UE_ID, such as its Temporary Mobile Subscriber Identity (TMSI)) and a MOD function. For example, a UE with UE_ID can access a non-barred band (sub-band) if the following is true:

sub-band=UE_ID MOD n

Here, n is the number of sub-bands and each sub-band is allocated an integer value from 0 to n-1 (meaning that each UE_ID will yield a value of UE_ID MOD n which associates it with one of the sub-bands). The above formula will spread UEs of a particular access class evenly amongst the allowed bands, while the barring bitmap is used to control the overall percentage of UEs on each band (in the example of Table 3, more access classes are allowed to access secondary band #3 than other bands, for example).

In another embodiment, the network signals predetermined values 'M', offset values $\{k_1, k_2, \ldots, k_n\}$ and a constant value 'C' to the UEs. The offsets may be specific to each NB-IoT band. The offsets may be signalled as an explicit list (for example, $\{1,3,5,7\}$) or may be signalled more compactly as a formula. For example, the formula $k_i=a*i+b$ may be used, in which 'i' iterates among the offsets and 'a' and 'b' are signalled parameters. Some of the parameters may be fixed, or may be a function of the access class, for example. The UE then determines whether it is eligible to attach to a sub-band that is not barred (by access class barring) by determining whether the following equation is satisfied for any value of the offset $k_i$:

(UE_ID+$k_i$)mod M=C

The UE then randomly chooses one of the bands for which it is eligible.

Note that the network can cause more UEs to select a certain band by increasing the number of assigned offsets for that band (assigning more values of $k_i$ to that band), or by reducing the 'M' parameter for that band. Hence, this embodiment allows congestion on bands to be controlled.

In another embodiment, the network signals values of 'M' and 'C' to UEs. The values of 'M' and/or 'C' may be specific to each band. The UE determines whether it is eligible to attach to a sub-band that is not barred (by access class barring) by determining whether the following equation is satisfied:

UE_ID modM<C

As per the previously described embodiment, the UE then randomly chooses one of the bands for which it is eligible.

In the above-mentioned embodiments, it is noted that each of the values M, C and $k_i$ may be integer values.

In another embodiment of the invention, an RSRP offset factor is signalled for each of the NB-IoT carriers. In this case, when selecting an NB-IoT carrier, the UE 104 will perform RSRP measurements on those carriers and add the appropriate RSRP offset factor for each NB-IoT carrier, to create a modified RSRP measurement. The UE may then select based on a criterion, such as the NB-IoT carrier with the best RSRP or modified RSRP measurement, or any of the NB-IoT carriers for which the modified RSRP measurement exceeds a threshold, for example.

Using this embodiment, the network may restrict the number of UEs that select different NB-IoT carriers. For a congested carrier, if the RSRP offset factor is large, only a few UEs will achieve the modified RSRP criterion (hence restricting the number of UEs that can access that NB-IoT carrier). In addition, those UEs that do select that congested carrier will operate in better channel conditions, will require less resource for operation and hence will ease the congestion on that congested carrier.

As an example of this embodiment, the RSRP factors for different NB-IoT carriers are shown in Table 4.

TABLE 4

| NB-IoT carrier | RSRP offset factor | Loading |
|---|---|---|
| Primary | −5 dB | High |
| Secondary #1 | −2 dB | Medium |
| Secondary #2 | −5 dB | High |
| Secondary #3 | +1 dB | Low |

In this example, the UE may measure the RSRP values and determine modified RSRP values as shown in Table 5 for the different NB-IoT carriers, leading to selection of secondary carrier #3.

TABLE 5

| NB-IoT carrier | Measured RSRP | RSRP offset factor | Modified RSRP |
|---|---|---|---|
| Primary | −95 dBm | −5 dB | −100 dBm |
| Secondary #1 | −96 dBm | −2 dB | −98 dBm |
| Secondary #2 | −94 dBm | −5 dB | −99 dBm |
| Secondary #3 | −98 dBm | +1 dB | −97 dBm |

Note that the primary NB-IoT carrier may be power-boosted. The RSRP offset factor described above can be used to account for the power boosting factor. For example, if the primary NB-IoT carrier is power-boosted by 6 dB and the system does not want the UE to select an NB-IoT carrier based on this power-boosting, the RSRP offset factor for the primary NB-IoT carrier for the system shown in Table 5 could be set as −5 dB−6 dB=−11 dB. Alternatively, the modified RSRP value could be calculated as "(measured RSRP)+(RSRP offset factor)−(power boosting factor)".

It will be appreciated that instead of the RSRP being used, any other suitable measure of signal quality may be used (for example the LTE measurement known as Reference Signal Received Quality, RSRQ). Thus, the RSRP offset factor (or value) may be, more generally, a signal quality offset factor, the RSRP measurement may be, more generally, a signal quality measurement, and the modified RSRP measurement may be, more generally, a modified signal quality measurement.

In another embodiment, an Access Class Factor (for example, a probability taking a value from 0 to 1) is signalled for each NB-IoT band. The UE 104 generates a random number between 0 and 1. The bands with AC Factor greater than this generated number are candidate NB-IoT bands. The UE selects the band with the AC Factor closest to this generated number. For example, the AC Factor for each band is as listed in Table 6. If the UE generated random number is 0.4, then the candidate bands are Secondary Band #1 (AC Factor=0.5) and Secondary Band #3 (AC Factor=0.9). Since Secondary Band #1 has an AC Factor closer to this generated number, the UE will select Secondary Band #1. The network can then set a high AC Factor for bands that are less congested and vice-versa for bands that more congested. It will also be appreciated that an alternative arrangement could be implemented in which the network sets a high AC Factor for bands that are more congested and vice-versa for bands that are less congested. In this case, it will be the bands with a lower AC Factor than the number randomly generated by the UE which are determined as the candidate bands.

TABLE 6

| NB-IoT Bands | AC Factor |
|---|---|
| Primary Band | 0.1 |
| Secondary Band #1 | 0.5 |
| Secondary Band #2 | 0.1 |
| Secondary Band #3 | 0.9 |

In another embodiment, among the bands that have AC Factors greater than (or, in the alternative arrangement, less than) the UE generated random number, the UE selects the band with the highest measured signal strength or quality (for example, RSRP).

In another embodiment, among the NB-IoT bands with AC Factor greater than (or, in the alternative arrangement, less than) the UE generated random number, the UE randomly selects one of these NB-IoT bands (using a uniform distribution, for example).

It should be appreciated that selection criteria can be a combination of two or more of the above embodiments. For example, an ACB can be used as a first congestion control followed by signal quality offset. In this case, the UE only allocates the signal quality offset values and calculates a modified signal quality measurement for NB-IoT bands that are not barred by the ACB.

It will thus be appreciated that the second embodiment of the present technique provides, in general, a terminal device (such as terminal device 104) for use with a wireless telecommunications network. The terminal device comprises a transceiver (implemented using, for example, transmitter 401 and receiver 402) configured to exchange signals with the wireless telecommunications network using one of a plurality of predetermined radio frequency resources. The terminal device also comprises a controller (such as controller 403) configured to determine a subset of the plurality of predetermined radio frequency resources on the basis of a network characteristic indicative of a network preference for biasing access to each predetermined radio frequency resource and an operational characteristic associated with the terminal device, and to select the one of the plurality of predetermined radio frequency resources from the determined subset.

In an embodiment, each of the plurality of predetermined radio frequency resources is a Narrowband Internet of Things (NB-IoT) carrier.

In an embodiment, the network characteristic indicative of the network preference for biasing access to each predetermined radio frequency resource is a number of access classes of terminal devices which are permitted to exchange signals with the wireless telecommunications network using that predetermined radio frequency resource and the operational characteristic associated with the terminal device is an access class of the terminal device. The controller is configured to include each predetermined radio frequency resource via which terminal devices with the access class of the terminal device are permitted to exchange signals with the wireless telecommunications network in the subset of the plurality of predetermined radio frequency resources. An example of this embodiment is described with reference to Table 3.

In an embodiment, the controller is configured to select, from the predetermined radio frequency resources of the subset, the predetermined radio frequency resource associated with the largest number of access classes of terminal devices which are permitted to exchange signals with the wireless telecommunications network using that predetermined radio frequency resource as the one of the plurality of predetermined radio frequency resources.

In an embodiment, the network characteristic indicative of the network preference for biasing access to each predetermined radio frequency resource is a signal quality offset value associated with that predetermined radio frequency resource and the operational characteristic associated with the terminal device is a signal quality measurement associated with each predetermined radio frequency resource. An example of this embodiment is described with reference to Tables 3 and 4.

In one embodiment, the controller is configured to include, in the subset of the plurality of predetermined radio frequency resources, each predetermined radio frequency resource associated with a modified signal quality measurement which exceeds a predetermined threshold, the modified signal quality measurement associated with each predetermined radio frequency resource being given by the signal quality measurement associated with that predetermined frequency resource added to the signal quality offset value associated with that predetermined radio frequency resource. In another embodiment, the controller is configured to include, in the subset of the plurality of predetermined radio frequency resources, a predetermined radio frequency resource associated with a highest modified signal quality measurement, the modified signal quality measurement associated with each predetermined radio frequency resource being given by the signal quality measurement associated with that predetermined frequency resource added to the signal quality offset value associated with that predetermined radio frequency resource.

In an embodiment, the calculation of the signal quality offset value associated with each predetermined radio frequency resource takes into account the effect of a signal quality boosting value associated with that predetermined radio frequency resource.

In an embodiment, for each predetermined radio frequency resource, the signal quality measurement is a Reference Signal Received Power (RSRP) measurement, the signal quality offset value is an RSRP offset value and the modified signal quality measurement is a modified RSRP measurement, wherein the RSRP offset value serves to reduce the modified RSRP measurement relative to the RSRP measurement for a predetermined radio frequency resource with a lower level of network preference for biasing access to that predetermined radio frequency resource and to increase the modified RSRP measurement relative to the RSRP measurement for a predetermined radio frequency resource with a higher level of network preference for biasing access to that predetermined radio frequency resource.

In an embodiment, the network characteristic indicative of the network preference for biasing access to each predetermined radio frequency resource is an access class factor associated with that predetermined radio frequency resource, the access class factor being a value within a predetermined range and being correlated with the level of network preference for biasing access to that predetermined radio frequency resource, and the operational characteristic associated with the terminal device is a randomly generated value within the predetermined range. The controller is configured to include, in the subset of the plurality of predetermined radio frequency resources, each predetermined radio frequency resource which either, in the case that the access class factor of each predetermined radio frequency resource is positively correlated with the level of network preference for biasing access to that radio frequency resource, has an access class factor greater than the randomly generated value of the terminal device, or, in the case that the access class factor of each predetermined radio frequency resource is negatively correlated with the level of network preference for biasing access to that radio frequency resource, has an access class factor less than the randomly generated value of the terminal device. An example of this embodiment is described with reference to Table 6 (in this case, the access class factor associated with each predetermined radio frequency resource is positively correlated with the level of network preference for biasing access to that predetermined radio resource).

In an embodiment, the predetermined range is from 0 to 1, and the access class factor is positively correlated with the level of the network preference for biasing access to each predetermined radio frequency resource (again, this is the case with the example of Table 6).

In an embodiment, the controller is configured to select, from the predetermined radio frequency resources of the subset, the predetermined radio frequency resource associated with the access class factor which is closest to the randomly generated value of the terminal device.

It will furthermore be appreciated that for each of the above-mentioned embodiments, when the one of the plurality of predetermined radio frequency resources is not chosen in a way specific to the method used, the controller may select, from the predetermined radio frequency resources of the subset, the predetermined radio frequency resource associated with the highest signal strength or signal quality as the one of the plurality of predetermined radio frequency resources.

Alternatively, the controller may be configured to randomly select, from the predetermined radio frequency resources of the subset, the one of the plurality of predetermined radio frequency resources.

Alternatively, the controller may be configured to select, from the predetermined radio frequency resources of the subset, the one of the plurality of predetermined radio frequency resources based on an identifier, UE_ID, of the terminal device.

For example, in one embodiment, there are n predetermined radio frequency resources in the subset and each predetermined radio frequency resource in the subset is associated with one of a respective integer identifier from 0 to n-1, and the controller is configured to select as the one of the plurality predetermined radio frequency resources the predetermined radio frequency resource with an identifier which is equal to UE-ID mod n.

In another embodiment, each predetermined radio frequency resource in the subset is associated with a respective one or more of predetermined offset values $k_i$, and the controller is configured to select as the one of the plurality of predetermined radio frequency resources a predetermined radio frequency resource associated with an offset value $k_i$ which satisfies:

$$(UE\_ID + k_i) \bmod M = C$$

wherein M and C are predetermined values. In one embodiment, C is constant for each predetermined radio frequency resource in the subset whereas M may be different for each predetermined radio frequency resource in the subset.

In another embodiment, each predetermined radio frequency resource in the subset is associated with a respective predetermined value M and a respective predetermined value C, and the controller is configured to select as the one of the plurality of predetermined radio frequency resources a predetermined radio frequency resource with respective predetermined values M and C which satisfy:

UE_ID mod M<C

It will also be appreciated that the second embodiment of the present technique provides, in general, infrastructure equipment (such as base station 101) for use with the wireless telecommunications network. The infrastructure equipment comprises a controller (such as controller 413) configured to generate the network characteristic indicative of the network preference for biasing access to each of the plurality of predetermined radio frequency resource by the terminal device (such as terminal device 104), the network characteristic determined for each predetermined radio frequency resource being for use by the terminal device in selecting the one of the plurality of predetermined radio frequency resources. The infrastructure equipment also comprises a transceiver (implemented using transmitter 411 and receiver 412, for example) configured to transmit, to the terminal device, the generated network characteristic indicative of the network preference for biasing access to each of the plurality of predetermined radio frequency resource by the terminal device, and to exchange signals with the terminal device using the one of the plurality of predetermined radio frequency resources.

Figure 7:
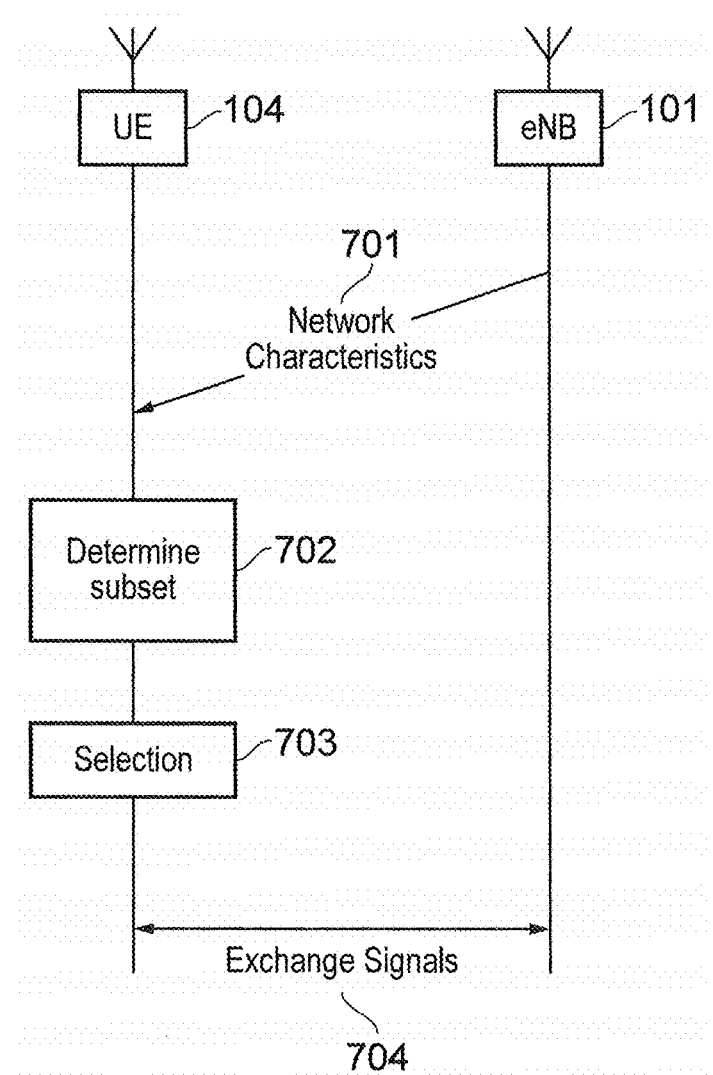
FIG. 7 schematically illustrates a method according to the second embodiment of the present technique.

FIGS. 7 and 8A-B schematically illustrate a method according to the second embodiment.

In FIG. 7, it can be seen that, at step 701, the infrastructure equipment (in the form of eNB 101) generates a network characteristic indicative of a network preference for biasing access to each of a plurality of predetermined radio frequency resource by the terminal device 104 of the wireless telecommunications network, the network characteristic determined for each predetermined radio frequency resource being for use by the terminal device 104 in selecting one of the plurality of predetermined radio frequency resources. The infrastructure equipment then transmits, to the terminal device 104, the generated network characteristic indicative of the network preference for biasing access to each of the plurality of predetermined radio frequency resource by the terminal device 104. At step 702, the terminal device 104 determines a subset of the plurality of predetermined radio frequency resources on the basis of the network characteristic indicative of the network preference for biasing access to each predetermined radio frequency resource and an operational characteristic associated with the terminal device 104. At step 703, the terminal device 104 selects the one of the plurality of predetermined radio frequency resources from the determined subset. At step 704, the terminal device 104 and infrastructure equipment exchange signals using the selected one of the plurality of predetermined radio frequency resources.

FIG. 8A shows a flow chart schematically illustrating the method carried out by the controller 403 of the terminal device 104. The method starts at step 8A. At step 802, the controller 403 determines the subset of the plurality of predetermined radio frequency resources on the basis of the network characteristic indicative of the network preference for biasing access to each predetermined radio frequency resource and the operational characteristic associated with the terminal device 104. At step 803, the controller 403 selects the one of the plurality of predetermined radio frequency resources from the determined subset. At step 804, the controller 403 controls the transceiver 401, 402 of the terminal device 104 to exchange signals with the wireless telecommunications network (for example, via the infrastructure equipment) using the selected one of the plurality of predetermined radio frequency resources. The method ends at step 805.

FIG. 8B shows a flow chart schematically illustrating the method carried out by the controller 413 of the infrastructure equipment (in the form of eNB 101). The method starts at step 806. At step 807, the controller 413 generates the network characteristic indicative of the network preference for biasing access to each of the plurality of predetermined radio frequency resources by the terminal device 104, the network characteristic determined for each predetermined radio frequency resource being for use by the terminal device 104 in selecting the one of the plurality of predetermined radio frequency resources. At step 808, the controller 413 controls the transceiver 411, 412 to transmit, to the terminal device 104, the generated network characteristic indicative of the network preference for biasing access to each of the plurality of predetermined radio frequency resource by the terminal device 104. At step 809, the controller 413 controls the transceiver 411, 412 to exchange signals with the terminal device 104 using the one of the plurality of predetermined radio frequency resources. The method ends at step 810.

Various embodiments of the present technique are described by the following numbered clauses:

Clause 1. A terminal device for use with a wireless telecommunications network, the terminal device comprising:

a transceiver configured to exchange signals with the wireless telecommunications network using one of a plurality of predetermined radio frequency resources; and a controller configured to determine a subset of the plurality of predetermined radio frequency resources on the basis of a network characteristic indicative of a network preference for biasing access to each predetermined radio frequency resource and an operational characteristic associated with the terminal device, and to select the one of the plurality of predetermined radio frequency resources from the determined subset.

Clause 2. A terminal device according to clause 1, wherein each of the plurality of predetermined radio frequency resources is a Narrowband Internet of Things (NB-IoT) carrier.

Clause 3. A terminal device according to clause 1 or 2, wherein:

the network characteristic indicative of the network preference for biasing access to each predetermined radio frequency resource is a number of access classes of terminal devices which are permitted to exchange signals with the wireless telecommunications network using that predetermined radio frequency resource;

the operational characteristic associated with the terminal device is an access class of the terminal device; and the controller is configured to include each predetermined radio frequency resource via which terminal devices with the access class of the terminal device are permitted to exchange signals with the wireless telecommunications network in the subset of the plurality of predetermined radio frequency resources.

Clause 4. A terminal device according to clause 3, wherein the controller is configured to select, from the predetermined radio frequency resources of the subset, the predetermined radio frequency resource associated with the largest number of access classes of terminal devices which are permitted to exchange signals with the wireless telecommunications network using that predetermined radio frequency resource as the one of the plurality of predetermined radio frequency resources.

Clause 5. A terminal device according to clause 1 or 2, wherein:

the network characteristic indicative of the network preference for biasing access to each predetermined radio frequency resource is a signal quality offset value associated with that predetermined radio frequency resource;

the operational characteristic associated with the terminal device is a signal quality measurement associated with each predetermined radio frequency resource; and the controller is configured to include, in the subset of the plurality of predetermined radio frequency resources, each predetermined radio frequency resource associated with a modified signal quality measurement which exceeds a predetermined threshold, the modified signal quality measurement associated with each predetermined radio frequency resource being given by the signal quality measurement associated with that predetermined frequency resource added to the signal quality offset value associated with that predetermined radio frequency resource.

Clause 6. A terminal device according to clause 1 or 2, wherein:

the network characteristic indicative of the network preference for biasing access to each predetermined radio frequency resource is a signal quality offset value associated with that predetermined radio frequency resource;

the operational characteristic associated with the terminal device is a signal quality measurement associated with each predetermined radio frequency resource; and the controller is configured to include, in the subset of the plurality of predetermined radio frequency resources, a predetermined radio frequency resource associated with a highest modified signal quality measurement, the modified signal quality measurement associated with each predetermined radio frequency resource being given by the signal quality measurement associated with that predetermined frequency resource added to the signal quality offset value associated with that predetermined radio frequency resource.

Clause 7. A terminal device according to clause 5 or 6, wherein the calculation of the signal quality offset value associated with each predetermined radio frequency resource takes into account the effect of a signal quality boosting value associated with that predetermined radio frequency resource.

Clause 8. A terminal device according to any one of clauses 5 to 7, wherein, for each predetermined radio frequency resource, the signal quality measurement is a Reference Signal Received Power (RSRP) measurement, the signal quality offset value is an RSRP offset value and the modified signal quality measurement is a modified RSRP measurement, wherein the RSRP offset value serves to reduce the modified RSRP measurement relative to the RSRP measurement for a predetermined radio frequency resource with a lower level of network preference for biasing access to that predetermined radio frequency resource and to increase the modified RSRP measurement relative to the RSRP measurement for a predetermined radio frequency resource with a higher level of network preference for biasing access to that predetermined radio frequency resource.

Clause 9. A terminal device according clause 1 or 2, wherein:

the network characteristic indicative of the network preference for biasing access to each predetermined radio frequency resource is an access class factor associated with that predetermined radio frequency resource, the access class factor being a value within a predetermined range and being correlated with the level of network preference for biasing access to that predetermined radio frequency resource;

the operational characteristic associated with the terminal device is a randomly generated value within the predetermined range; and the controller is configured to include, in the subset of the plurality of predetermined radio frequency resources, each predetermined radio frequency resource which either:

in the case that the access class factor of each predetermined radio frequency resource is positively correlated with the level of network preference for biasing access to that radio frequency resource, has an access class factor greater than the randomly generated value of the terminal device; or in the case that the access class factor of each predetermined radio frequency resource is negatively correlated with the level of network preference for biasing access to that radio frequency resource, has an access class factor less than the randomly generated value of the terminal device.

Clause 10. A terminal device according to clause 9, wherein the predetermined range is from 0 to 1, and the access class factor is positively correlated with the level of the network preference for biasing access to each predetermined radio frequency resource.

Clause 11. A terminal device according to clause 9 or 10, wherein the controller is configured to select, from the predetermined radio frequency resources of the subset, the predetermined radio frequency resource associated with the access class factor which is closest to the randomly generated value of the terminal device.

Clause 12. A terminal device according to any one of clauses 1 to 3, 5, 9 and 10, wherein the controller is configured to select, from the predetermined radio frequency resources of the subset, the predetermined radio frequency resource associated with the highest signal strength or signal quality as the one of the plurality of predetermined radio frequency resources.

Clause 13. A terminal device according to any one of clauses 1 to 3, 5, 9 and 10, wherein the controller is configured to randomly select, from the predetermined radio frequency resources of the subset, the one of the plurality of predetermined radio frequency resources.

Clause 14. A terminal device according to any one of clauses 1 to 3, 5, 9 and 10, wherein the controller is configured to select, from the predetermined radio frequency resources of the subset, the one of the plurality of predetermined radio frequency resources based on an identifier, UE_ID, of the terminal device.

Clause 15. A terminal device according to clause 14, wherein there are n predetermined radio frequency resources in the subset and each predetermined radio frequency resource in the subset is associated with one of a respective integer identifier from 0 to n-1, and the controller is configured to select as the one of the plurality predetermined radio frequency resources the predetermined radio frequency resource with an identifier which is equal to UE-ID mod n.

Clause 16. A terminal device according to clause 14, wherein each predetermined radio frequency resource in the subset is associated with a respective one or more of predetermined offset values $k_i$, and the controller is configured to select as the one of the plurality of predetermined radio frequency resources a predetermined radio frequency resource associated with an offset value $k_i$ which satisfies:

$$(\text{UE\_ID} + k_i) \bmod M = C$$

wherein M and C are predetermined values.

Clause 17. A terminal device according to clause 14, wherein each predetermined radio frequency resource in the subset is associated with a respective predetermined value M and a respective predetermined value C, and the controller is configured to select as the one of the plurality of predetermined radio frequency resources a predetermined radio frequency resource with respective predetermined values M and C which satisfy:

$$UE\_ID \bmod M < C$$

Clause 18. Infrastructure equipment for use with a wireless telecommunications network, the infrastructure equipment comprising:

a controller configured to generate a network characteristic indicative of a network preference for biasing access to each of a plurality of predetermined radio frequency resource by a terminal device of the wireless telecommunications network, the network characteristic determined for each predetermined radio frequency resource being for use by the terminal device in selecting one of the plurality of predetermined radio frequency resources; and a transceiver configured to:
transmit, to the terminal device, the generated network characteristic indicative of the network preference for biasing access to each of the plurality of predetermined radio frequency resource by the terminal device; and
exchange signals with the terminal device using the one of a plurality of predetermined radio frequency resources.

Clause 19. A method of operating a terminal device for use with a wireless telecommunications network, the method comprising:

determining a subset of a plurality of predetermined radio frequency resources on the basis of a network characteristic indicative of a network preference for biasing access to each predetermined radio frequency resource and an operational characteristic associated with the terminal device;

selecting one of the plurality of predetermined radio frequency resources from the determined subset; and controlling a transceiver of the terminal device to exchange signals with the wireless telecommunications network using the selected one of the plurality of predetermined radio frequency resources.

Clause 20. A method of operating infrastructure equipment for use with a wireless telecommunications network, the method comprising:

generating a network characteristic indicative of a network preference for biasing access to each of a plurality of predetermined radio frequency resources by a terminal device of the wireless telecommunications network, the network characteristic determined for each predetermined radio frequency resource being for use by the terminal device in selecting one of the plurality of predetermined radio frequency resources; and controlling a transceiver of the infrastructure equipment to:

transmit, to the terminal device, the generated network characteristic indicative of the network preference for biasing access to each of the plurality of predetermined radio frequency resources by the terminal device; and exchange signals with the terminal device using the selected one of the plurality of predetermined radio frequency resources.

Clause 21. A wireless telecommunications system comprising a terminal device according to any one of clauses 1 to 17 and infrastructure equipment according to clause 18.

Clause 22. A terminal device for use with a wireless telecommunications network, the terminal device comprising:

a transceiver configured to receive information indicative of one or more access classes of terminal devices which are permitted to exchange signals with the wireless telecommunications network; and a controller configured to update the received information to modify the one or more access classes of terminal devices which are permitted to exchange signals with the mobile telecommunications network, the received information being updated by the controller according to a predetermined function of time.

Clause 23. A terminal device according to clause 22, wherein the controller is configured to control the transceiver to exchange signals with the wireless telecommunications network at a particular time when an access class of the terminal device matches one of the one or more access classes of terminal devices which are permitted to exchange signals with the wireless telecommunications network at that particular time.

Clause 24. A terminal device according to clause 22, wherein the transceiver is configured to receive at least one of the information and the predetermined function of time via a system information broadcast message from the wireless telecommunications network.

Clause 25. A terminal device according to any one of clauses 22 to 24, wherein the controller is operable to periodically update the received information at a time period and in a manner specified by the predetermined function of time.

Clause 26. A terminal device according to clause 25, wherein the information indicative of the one or more access classes of terminal devices which are permitted to exchange signals with the wireless telecommunications network is a bitmap, wherein the position of each bit in the bitmap is indicative of a respective access class and the bit at each position is indicative of whether or not that access class is permitted to exchange signals with the wireless telecommunications network.

Clause 27. A terminal device according to clause 26, wherein each update of the bitmap comprises performing a shift operation on elements of the bitmap in accordance with a predetermined rule.

Clause 28. A terminal device according to clause 26, wherein each update of the bitmap comprises defining the bitmap as one of a plurality of predetermined bitmaps.

Clause 29. A terminal device according to any one of clauses 22 to 28, wherein the possible updates of the information are consecutively applied and periodically repeated.

Clause 30. A terminal device according to any one of clauses 22 to 29, wherein the time period at which the received information is periodically updated is defined with reference to a time changing parameter associated with successive radio frames via which the transceiver is configured to exchange signals with the wireless telecommunications network.

Clause 31. A terminal device according to clause 30, wherein the time changing parameter is a system frame number (SFN) or Hyper-system frame number (H-SFN) of successive radio frames.

Clause 32. A terminal device according to clause 31, wherein the time period at which the received information is periodically updated is defined by a predetermined number N of SFNs or H-SFNs.

Clause 33. A terminal device according to clause 32, wherein the update to the information is applied when the following equation is satisfied:

$$\text{H-SFN} \bmod N = 0$$

Clause 34. A terminal device according to clause 32, wherein there are M possible updates to the information indicative of the one or more access classes of terminal devices which are permitted to exchange signals with the wireless telecommunications network, each possible update is associated with a respective index value from 0 to M-1, and the update of the information used to define the one or more access classes of terminal devices which are permitted to exchange signals with the wireless telecommunications network for a given H-SFN is the update with index:

$$\left\lfloor \frac{H - SFN}{N} \right\rfloor \mathrm{mod} M$$

Clause 35. A terminal device according to any one of clauses 22 to 34, wherein the terminal device is a Narrowband Internet of Things (NB-IoT) terminal device.

Clause 36. Infrastructure equipment for use with a wireless telecommunications network, the infrastructure equipment comprising:

a controller configured to generate information indicative of one or more access classes of terminal devices which are permitted to exchange signals with the wireless telecommunications network and to generate a function of time according to which a terminal device of the wireless telecommunications network is configured to update the information to modify the one or more access classes of terminal devices which are permitted to exchange signals with the mobile telecommunications network; and a transceiver configured to transmit the generated information and function of time to the terminal device.

Clause 37. A method of controlling a terminal device for use with a wireless telecommunications network, the method comprising:

controlling a transceiver of the terminal device to receive information indicative of one or more access classes of terminal devices which are permitted to exchange signals with the wireless telecommunications network; and updating the received information to modify the one or more access classes of terminal devices which are permitted to exchange signals with the mobile telecommunications network, the received information being updated by the controller according to a predetermined function of time.

Clause 38. A method of controlling infrastructure equipment for use with a wireless telecommunications network, the method comprising:

generating information indicative of one or more access classes of terminal devices which are permitted to exchange signals with the wireless telecommunications network and generating a function of time according to which a terminal device of the wireless telecommunications network is configured to update the information to modify the one or more access classes of terminal devices which are permitted to exchange signals with the mobile telecommunications network; and controlling a transceiver of the infrastructure equipment to transmit the generated information and function of time to the terminal device.

Clause 39. A wireless telecommunications system comprising a terminal device according to any one of clauses 22 to 35 and infrastructure equipment according to clause 36.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Annex 1:

The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel PDCCH, a physical control format indicator channel PCFICH and a physical HARQ indicator channel PHICH. The data region may contain a number of physical channel for the transmission of data, such as a physical downlink shared channel PDSCH and a physical broadcast channels PBCH. Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control RRC signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDSCH so that only relevant data within the PDSCH is detected and estimated. In order to inform the UEs of the location of their allocated communications resources, resource control information specifying downlink resource allocations is conveyed across the PDCCH in a form termed downlink control information DCI, where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Each uplink subframe may include a plurality of different channels, for example a physical uplink shared channel PUSCH 305, a physical uplink control channel PUCCH 306, and a physical random access channel PRACH. The physical Uplink Control Channel PUCCH may carry control information such as ACK/NACK to the eNodeB for downlink transmissions, scheduling request indicators SRI for UEs wishing to be scheduled uplink resources, and feedback of downlink channel state information CSI for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals DMRS 307 and sounding reference signals SRS 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB B. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information UCI on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signalling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

REFERENCES

[1] LTE for UMTS: OFDMA and SC-FDMA Based Radio Access, Harris Holma and Antti Toskala, Wiley 2009, ISBN 978-0-470-99401-6.
[2] RP-151621, "New Work Item: NarrowBand IOT NB-IOT," Qualcomm, RAN #69
[3] R1-157783, "Way Forward on NB-IoT," CMCC, Vodafone, Ericsson, Huawei, HiSilicon, Deutsche Telekom, Mediatek, Qualcomm, Nokia Networks, Samsung, Intel, Neul, CATR, AT&T, NTT DOCOMO, ZTE, Telecom Italia, IITH, CEWiT, Reliance-Jio, CATT, u-blox, China Unicom, LG Electronics, Panasonic, Alcatel-Lucent, Alcatel-Lucent Shanghai Bell, China Telecom, RAN1 #83
[4] "Draft Report of 3GPP TSG RAN WG2 meeting #92" ftp://ftp.3gpp.org/tsg_ran/WG2_RL2/TSGR2_92/Report/ R2-16xxxx_draft_report_RAN2_92_Anaheim_v0.1.zip

The invention claimed is:

1. A method of operating infrastructure equipment for use with a wireless telecommunications network, the method comprising:
generating a network characteristic indicative of a network preference for biasing access to each of a plurality of predetermined radio frequency resources by a terminal device of the wireless telecommunications network, the network characteristic determined for each predetermined radio frequency resource being for use by the terminal device in selecting one of the plurality of predetermined radio frequency resources; and
controlling a transceiver of the infrastructure equipment to:
transmit, to the terminal device, the generated network characteristic indicative of the network preference for biasing access to each of the plurality of predetermined radio frequency resources by the terminal device; and
exchange signals with the terminal device using the selected one of the plurality of predetermined radio frequency resources.

2. The method of claim 1, wherein each of the plurality of predetermined radio frequency resources is a Narrowband Internet of Things (NB-IoT) carrier.

3. The method of claim 1, wherein the terminal device is a Narrowband Internet of Things (NB-IoT) terminal device.

4. The method of claim 1, wherein the network characteristic indicative of the network preference for biasing access to each of the plurality of predetermined radio frequency resources is a number of access classes of terminal devices which are permitted to exchange signals with the wireless telecommunications network using that predetermined radio frequency resource.

5. The method of claim 1, wherein a predetermined radio frequency resource associated with the highest signal strength or signal quality is selected from the plurality of predetermined radio frequency resources.

6. A method of controlling a terminal device for use with a wireless telecommunications network, the method comprising:
controlling a transceiver of the terminal device to receive information indicative of one or more access classes of terminal devices which are permitted to exchange signals with the wireless telecommunications network;
updating the received information to modify the one or more access classes of terminal devices which are permitted to exchange signals with the wireless telecommunications network, the received information being updated by the controller according to a predetermined function of time; and
controlling the transceiver to exchange signals with the wireless telecommunications network at a particular e when an access class of the terminal device matches one of the one or more access classes of terminal devices which are permitted to exchange signals with the wireless telecommunications network at that particular time.

7. The method of claim 6, wherein the terminal device is a Narrowband Internet of Things (NB-IoT) terminal device.

8. The method of claim 7, further comprising:
receiving, by the transceiver, at least one of the information and the predetermined function of time via a system information broadcast message from the wireless telecommunications network.

9. The method of claim 6, further comprising:
receiving, by the transceiver, at least one of the information and the predetermined function of time via a system information broadcast message from the wireless telecommunications network.

10. The method of claim 6, further comprising:
receiving, by the transceiver, at least one of the information and the predetermined function of time via a system information broadcast message from the wireless telecommunications network.

11. The method of claim 6, further comprising:
periodically updating the received information at a time period and in a manner specified by the predetermined function of time.

12. The method of claim 11, wherein the information indicative of the one or more access classes of terminal devices which are permitted to exchange signals with the wireless telecommunications network is a bitmap.

13. The method of claim 12, wherein a position of each bit in the bitmap is indicative of a respective access class and the bit at each position is indicative of whether or not that access class is permitted to exchange signals with the wireless telecommunications network.

14. A terminal device for use with a wireless telecommunications network, the terminal device comprising:
circuitry configured to:
control a transceiver of the terminal device to receive information indicative of one or more access classes of terminal devices which are permitted to exchange signals with the wireless telecommunications network;
update the received information to modify the one or more access classes of terminal devices which are permitted to exchange signals with the wireless telecommunications network, the received information being updated by the controller according to a predetermined function of time; and
control the transceiver to exchange signals with the wireless telecommunications network at a particular time when an access class of the terminal device matches one of the one or more access classes of terminal devices which are permitted to exchange signals with the wireless telecommunications network at that particular time.

15. The terminal device of claim 14, wherein the time period at which the received information is periodically updated is defined with reference to a time changing parameter associated with successive radio frames via which the transceiver is configured to exchange signals with the wireless telecommunications network.

16. The terminal device of claim 15, wherein the transceiver is configured to receive at least one of the information and the predetermined function of time via a system information broadcast message from the wireless telecomunications network.

17. The terminal device of claim 14, wherein the transceiver is configured to receive at least one of the information and the predetermined function of time via a system information broadcast message from the wireless telecommunications network.

18. The terminal device of claim 14, wherein the circuitry is configured to periodically update the received information at a time period and in a manner specified by the predetermined function of time.

19. The terminal device of claim 18, wherein the information indicative of the one or more access classes of terminal devices which are permitted to exchange signals with the wireless telecommunications network is a bitmap.

20. The terminal device of claim 19, wherein a position of each bit in the bitmap is indicative of a respective access class and the bit at each position is indicative of whether or not that access class is permitted to exchange signals with the wireless telecommunications network.

* * * * *